ELECTRONIC LOGICAL CIRCUITS

Filed March 3, 1955

INVENTOR.
LEONARD R. HARPER
BY Joseph C. Sweet, Jr.
ATTORNEY

United States Patent Office 2,841,708

Patented July 1, 1958

2,841,708

ELECTRONIC LOGICAL CIRCUITS

Leonard R. Harper, Poughkeepsie, N. Y., assignor to International Business Machines Corporation, New York, N. Y., a corporation of New York Application March 3, 1955, Serial No. 491,970

13 Claims. (Cl. 250—27)

This invention relates to logical circuits and more particularly to an electronic circuit which provides, at one and the same time, logical circuits of the "Exclusive Or" type, the Or type, and the And (or But) Not types.

With the advent of large-scale computers, electronic logical circuits have become increasingly important. One of the types of logical circuits is called the And or coincidence circuit. Such a circuit has at least two inputs and produces an output only when a voltage is applied to both inputs at the same time. Another type of logical circuit is called the And Not, But Not or inhibiting circuit. It, again, has two inputs but produces an output only when a voltage is applied to a specific one of the inputs in the absence of a voltage applied to the other input. A third type of logical circuit is called the Or or mixer circuit. Such a circuit has at least two inputs and produces an output whenever a voltage is applied to any of the inputs. Still another type of logical circuit is called the "Exclusive Or" or anti-coincidence circuit. Such a circuit has two inputs and produces an output only when a voltage is applied to a single input at a time. It differs from the But Not circuit in that an output is produced when a voltage is applied individually to either of the inputs, whereas in the But Not circuit the single input must be applied to a specified one of the inputs, with no input applied to the other or inhibiting input. Prior art circuits of the "Exclusive Or" type have involved the use of numerous components including, for example, a plurality of delay circuits, gate circuits, and inversion devices as shown in Figure 4 of United States Patent No. 2,636,133 granted April 21, 1953, to L. W. Hussey, covering a pulse type circuit.

Accordingly, one object of the present invention is to provide a simple, inexpensive electronic logical circuit of the "Exclusive Or" type involving a minimum of components and which is direct-coupled to the inputs.

Another object of this invention is to provide such a circuit of the logical Or type.

Another object of this invention is to provide such a circuit of the logical And type.

Another object of this invention is to provide such a circuit of the logical But Not type.

Still another object of this invention is to provide such a circuit combining two or more of these logical circuits, available at selective outputs.

A further object of this invention is to provide such a circuit utilizing a pentagrid electronic vacuum tube.

Other objects of this invention will be pointed out in the following description and claims and illustrated in the accompanying drawings, which disclose, by way of example, the principle of the invention and the best mode which has been contemplated of applying that principle.

As is well known, no plate current flows in a vacuum tube when its control grid (or one of its control grids, in the case of a multigrid tube) is negatively biased beyond "cut off." When the negative potential applied to the control grid is reduced below this "cut off" value, plate current begins to flow and the tube conducts. When and if the potential applied to the grid is made positive, current flows in the grid circuit in the positive direction and, ordinarily, as more positive grid current flows, the plate current rises rapidly to a saturation value determined by the tube parameters and remains substantially at this value as the grid current continues to increase.

However, it has been found that in a pentagrid converter tube, such as types 6BA7, 6BE6, and 6SB7Y, as the first grid current increases in the positive direction, the plate current falls abruptly, within a certain range of first grid current, to approximately 10 percent of its saturation value. For example, in the type 6BA7 tube this range is from +1.2 to +2.5 ma. of first grid current. In other words, with a first grid current of from 0 to +1.2 ma. the plate current flow is approximately constant at its saturation value, but then falls off sharply as the first grid current is further increased, reaching a value of approximately 10 percent of saturation at 2.5 ma., and then continues to decrease slightly as the first grid current is further increased.

In accordance with the present invention, advantage is taken of this phenomenon by providing a pentagrid converter tube which has two inputs applied to its first grid through individual impedance and which is normally biased beyond "cut off" through another impedance. The applied biasing potential, the magnitudes of the input signals, and the values of the impedances are chosen such that when only one input is applied, saturation value of plate current flows and the first grid current value lies between 0 and the minimum critical value referred to above. These parameters are also selected such that when both inputs are applied simultaneously, the first grid current value is greater than the second critical value referred to above and the plate current flow is thus substantially reduced (by a factor of 10), so that the tube then may be effectively regarded as producing "no output."

Figure 1:
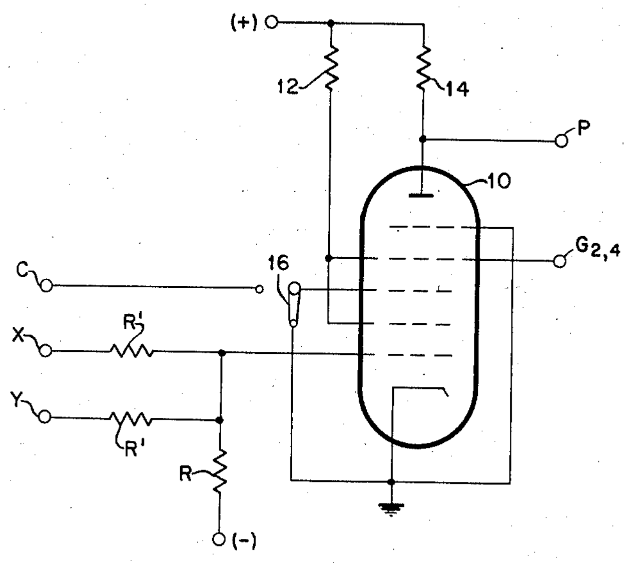
Fig. 1 is a circuit diagram of an embodiment of the present invention.

Referring now to Fig. 1, a pentagrid vacuum tube 10, which may be a type 6BA7, is provided and has its cathode and fifth grid grounded. For convenience hereafter the five grids will be referred to as grids $G_1$, $G_2$, $G_3$, $G_4$, and $G_5$, grid $G_1$ being the one nearest the cathode. Grids $G_2$ and $G_4$ are connected together and through resistor 12 of ohmic value 15K to a +150 volt source of potential, and the plate is connected through a respective resistor 14, also of ohmic value 15K, to the same potential source. Grid $G_3$ may be connected through switch 16 either to ground, as shown, or to an input terminal designated C. Grid $G_1$ is connected to a −175 volt source of potential through resistor R and is also connected to input terminals X and Y through respective resistors R′, these resistors being so designated to indicate that their ohmic value may differ from that of resistor R, although in the disclosed embodiment they are all of the same ohmic value, 56K.

Assuming that grid $G_3$ is connected to ground as shown in Fig. 1, the operation of the circuit will now be described for various combinations of voltages applied to input terminals X and Y, it being assumed that each terminal is at a +50 volt potential normally and that the input voltages are positive and each of 100 volts magnitude. Referring for the moment to the upper five waveforms shown in Fig. 2, in the absence of any signals applied to inputs X and Y, the potential of plate P and that of grids $G_2$ and $G_4$ are each +150 volts, inasmuch as tube 10 is not then conducting, and, applying simple network theory, it is apparent that the potential of grid $G_1$ is $-25$ volts (its waveform is not shown).

If a positive signal of 100 volts magnitude is now applied to input X (with no signal applied to input Y), the potential at grid $G_1$ would, if there was no flow of grid $G_1$ current, rise to $+8\frac{1}{3}$ volts, which is greater than the cut-off value for the tube. (Actually, for a type 6BA7 or similar tube, approximately 0.42 ma. grid $G_1$ current does flow, and the potential of grid $G_1$ therefore is approximately $+0.3$ volt.) Tube 10 will now conduct, with maximum or saturation value of plate current flowing, causing the potentials of plate P and of grids $G_2$ and $G_4$ to fall, as shown in the fourth and fifth lines, respectively, of Fig. 2. The exact magnitude of the respective potentials at the plate and at these grids will depend, of course, upon the current passing through the tube and the ohmic value of resistors 12 and 14.

The same action occurs if a positive signal of 100 volts magnitude is applied to input Y without a simultaneous voltage signal being applied to input X.

However, when respective positive signals, each of 100 volts magnitude, are simultaneously applied to inputs X and Y, the potential at grid $G_1$ would rise to $+41\frac{2}{3}$ volts if there was no flow of grid $G_1$ current. However, for a type 6BA7 or similar tube, approximately 2.5 milliamperes of grid current will flow, and therefore the potential of $G_1$ will be approximately $+2.0$ volts. As explained above, due to the construction of the first two grids of pentagrid converters such as the type 6BA7, few electrons from the cathode can then reach the plate, which will therefore assume a value in the neighborhood of $+150$ volts, the actual steady state value being determined by the drop of plate current to 10% of its saturation value as explained above. In the absence of sampling pulses from input terminal C (i. e., with grid $G_3$ grounded through switch 16, as shown in Fig. 1), transient voltage "spikes" (shown dotted) occur [*a*] as the plate current increases from zero (cut-off) through its saturation value and then falls to approximately 10% of this value, when both input voltages X and Y are simultaneously applied, and [*b*] as the plate current thereafter increases from this 10% value through its saturation value and then falls to zero (cut-off), when both input voltages X and Y are removed. The steady state values of the plate current and voltage when both input voltages X and Y are applied to tube 10 are what is referred to herein as indicating "no output" from the tube at this time, and may be utilized without a sampling pulse applied from input terminal C to grid $G_3$, by sampling the tube output at a time when the latter is known to have settled down or arrived at this steady state, which sampling is conventional in many present day computer circuits.

Figure 2:
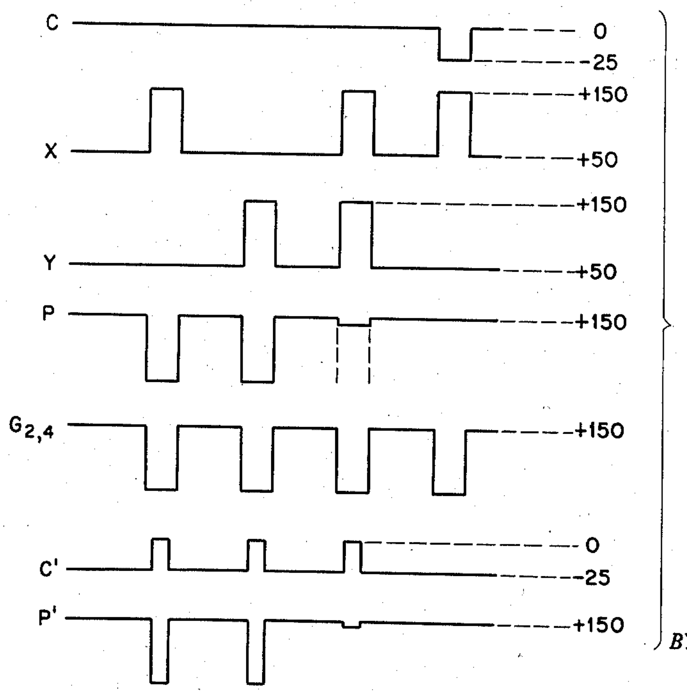
Fig. 2 shows waveforms at the input and output of the circuit of Fig. 1 to illustrate its operation.

Note that while "no output" is produced from the plate circuit for simultaneous input voltages X and Y, full current will flow through the grids $G_{2,4}$ circuit, and the potential of these grids will accordingly drop as shown in the fifth line of Fig. 2.

There thus has been disclosed and described a simple, inexpensive "exclusive Or" logical circuit, in that an output is produced at terminal P in response to an input signal applied to either input terminal X or terminal Y, but not to both simultaneously. It is further to be noted that only a single pentagrid converter tube is required, together with five resistors connected as shown.

It should be noted, in addition, that the circuit described above also functions, insofar as the terminal $G_{2,4}$ is concerned, as a logical circuit of the Or type, since it is evident from an inspection of Fig. 2 that an output is produced at this terminal whenever an input signal is applied to either input terminal X or Y, or to both simultaneously.

The description thus far has assumed that switch 16 is in the position shown in Fig. 1, i. e., that grid $G_3$ is grounded. Alternatively, switch 16 can be thrown to the other position and input C then used either as an inhibiting input or as an enabling input so far as the plate circuit is concerned. If input C is normally returned to ground and a negative signal of sufficient magnitude (e. g., $-25$ volts) applied thereto at the same time that a positive signal of $+100$ volts magnitude is applied to either inputs X or Y individually, the negative output which would otherwise occur at the plate is suppressed, as shown in the right-hand portion of the upper five lines of Fig. 2. Note also that this inhibiting pulse at input C does not, however, have any effect so far as the grids $G_{2,4}$ output is concerned. On the other hand, to function as an enabling input, input C would normally be returned to a source of negative potential (e. g., $-25$ volts) and a positive pulse of sufficient magnitude to raise grid $G_1$ to ground potential then applied during the period that a positive signal of $+100$ volts magnitude is applied to inputs X and Y individually or simultaneously, as shown in the sixth line of Fig. 2, labelled C'. The resultant output then at the plate terminal P for the various input combinations is shown in the bottom line of Fig. 2, labelled P'. Note that by delaying the start of each enabling pulse until after the start of the concurrent input signal(s) X and/or Y and terminating it before their respective terminations, this enabling pulse then functions as a "sampling" pulse for the circuit, i. e., it prevents the occurrence of the spikes referred to above at plate terminal P when input signals X and Y are applied simultaneously. Note also that in the absence of this enabling or sampling pulse at input C, no output is produced at terminal P, as shown at the right-hand portion of lines C' and P', even when input signal X is applied individually. Again, this enabling pulse at input C has no effect so far as the grids $C_{2,4}$ output is concerned.

When input C is used as an enabling input, it functions with either input X or input Y to provide a logical circuit and the And type, whose output is available at terminal P, and when input C is used as an inhibiting input, it functions similarly to produce a logical circuit of the But Not type.

There thus has been disclosed and described a simple, inexpensive electronic circuit which provides, at one and the same time, logical circuits of the "Exclusive Or type, of the Or type, and of the And or But Not type.

As pointed out previously, the values of resistors R and R' are selected in relation to the input signal voltages and the negative biasing potential for grid $G_1$ so as to cause the value of grid $G_1$ current to lie on either side of the critical range of values, depending upon whether one input signal or both are applied, and further so that the tube is non-conducting or "cut off" in the absence of either signal. While the values of resistors R and R' have been described above as equal and of ohmic value 56K, other values of these resistors may also be chosen while still meeting the above conditions. For example, resistors R' may be equal to twice the ohmic value of resistor R and the negative biasing potential then reduced to 100 volts instead of 175 volts.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. An electronic logical circuit comprising: a pentagrid vacuum tube having its cathode and fifth grid connected together and to a point of predetermined potential; a first load impedance; means coupling the second and fourth grids of said tube together and, through said first load impedance, to a source of positive potential; a second load impedance coupling the plate of said tube to a source of positive potential; bias means for normally biasing the first grid of said tube beyond cut-off including third, fourth, and fifth impedances, each having one terminal connected to said first grid; and, a source of input pulses connected to the third grid of said tube; whereby an output is produced at said second and fourth grids in response to positive input signals applied to the other terminal of either or both of said fourth and fifth impedances, and an output is produced at said plate in response to an individual positive input signal applied to the other terminal of either of said fourth and fifth impedances but not both, under control of the input pulses applied to said third grid.

2. An electronic logical circuit in accordance with claim 1 wherein said third, fourth and fifth impedances comprise resistors of equal ohmic value.

3. An electronic logical circuit in accordance with claim 1 wherein said third, fourth and fifth impedances comprise resistors and the ohmic value of each of said fourth and fifth impedances is twice that of said third impedance.

4. An electronic logical circuit comprising: a pentagrid vacuum tube having its cathode, third, and fifth grids connected together and to a point of predetermined potential; a first load impedance; means coupling the second and fourth grids of said tube together and, through said first load impedance, to a source of positive potential; a second load impedance coupling the plate of said tube to a source of positive potential; bias means for normally biasing the first grid of said tube beyond cut-off including a third series impedance; and, fourth and fifth impedances, each also having one terminal connected to said first grid; whereby an output is produced at said plate in response to an individual positive input signal applied to the other terminal of either of said fourth and fifth impedances but not to simultaneous inputs applied thereto, and an output is produced at said second and fourth grids in response to an individual positive input signal applied to the other terminal of either of said fourth and fifth impedances or to both simultaneously.

5. An electronic logical circuit in accordance with claim 4 wherein said third, fourth and fifth impedances comprise resistors of equal ohmic value.

6. An electronic logical circuit in accordance with claim 4 wherein said third, fourth and fifth impedances comprise resistors and the ohmic value of each of said fourth and fifth impedances is twice that of said third series impedance.

7. An electronic logical circuit comprising: a pentagrid vacuum tube having its cathode, third, and fifth grids connected together and to a point of predetermined potential; means coupling its second and fourth grids together and to a source of positive potential; a first load impedance coupling its plate to a source of positive potential; bias means for normally biasing its first grid beyond cut-off including a second series impedance; and, third and fourth impedances, each having one terminal also connected to said first grid; whereby an output is produced at said plate in response to an individual positive input signal applied to the other terminal of either of said third and fourth impedances but not to simultaneous positive input signals applied thereto.

8. An electronic logical circuit comprising: a pentagrid vacuum tube whose cathode and fifth grid are connected together and to a point of predetermined potential; means coupling its second and fourth grids together and to a source of positive potential; a load impedance coupling its plate to a source of positive potential; means for normally biasing its first grid beyond cut-off; means for normally biasing its third grid at said predetermined potential; means coupling said first grid to a source of positive input signals; and, means coupling said third grid to a source of negative input pulses; whereby an output is produced at said plate in response to the occurrence of said positive input signals in the absence of the simultaneous occurrence of said negative input pulses but no output is produced at said plate when said positive input signals and said negative input pulses occur simultaneously.

9. An electronic logical circuit comprising: a pentagrid vacuum tube having its cathode and fifth grid connected together and to a point of predetermined potential; means coupling its second and fourth grids together and to a source of positive potential; a first load impedance coupling its plate to a source of positive potential; bias means for normally biasing its first grid beyond cut-off including a second series impedance, and third and fourth impedances, each having one terminal also connected to said first grid; bias means for normally biasing its third grid at said predetermined potential; and, a source of negative input pulses connected to said third grid; whereby an output is produced at said plate only in response to an individual positive input signal applied to the other terminal of either of said third and fourth impedances in the absence of a negative input pulse applied to said third grid.

10. An electronic logical circuit comprising a pentagrid vacuum tube whose plate current/first grid current characteristic is non-linear for positive values of first grid current and changes from maximum to minimum values within a critical range of first grid current flow defined by first and second critical values thereof, means for applying operating potentials to said tube including a first load impedance connected to its plate and a second series impedance and a source of negative potential connected to its first grid to bias said tube beyond its "cut off" value, and third and fourth impedances, each having one terminal also connected to said first grid and adapted to have individual input voltages applied to their respective other terminals, the magnitude of said source of negative potential and the values of said second, third and fourth impedances being so related to the magnitudes of the input voltages that when only one input voltage is applied, the value of first grid current lies between zero and said first critical value and the plate current flow is at its maximum value, whereas when both input voltages are applied simultaneously, the value of first grid current is greater than said second critical value and the plate current flow is at its minimum value.

11. An electronic logical circuit in accordance with claim 10 wherein the third grid of said tube is normally biased to prevent plate current flow, and including a source of positive "sampling" pulses applied to said third grid with at least one of said "sampling" pulses occurring coincident with said simultaneous input voltages to allow plate current flow.

12. An electronic logical circuit in accordance with claim 10 wherein the third grid of said tube is normally biased to allow plate current flow under control of said first grid potential, and including a source of negative inhibiting pulses applied to said third grid to prevent plate current flow regardless of said first grid potential.

13. An electronic logical circuit in accordance with claim 10 including an additional impedance and means coupling the second and fourth grids of said tube together and, through said additional impedance, to a source of positive potential to provide an output at said second and fourth grids in response to individual or simultaneous input voltages applied to said third and fourth impedances.

References Cited in the file of this patent

UNITED STATES PATENTS

| | | |
|---|---|---|
| 2,211,942 | White | Aug. 20, 1940 |
| 2,212,558 | Blumlein | Aug. 27, 1940 |
| 2,461,895 | Hardy et al. | Feb. 15, 1949 |
| 2,519,763 | Hoglund | Aug. 22, 1950 |
| 2,538,027 | Mozley | Jan. 16, 1951 |
| 2,564,692 | Hoeppner | Aug. 21, 1951 |